US005776329A

United States Patent [19]
Krynitz et al.

[11] Patent Number: 5,776,329
[45] Date of Patent: Jul. 7, 1998

[54] METHOD FOR THE DECOMPOSITION AND RECOVERY OF METALLIC CONSTITUENTS FROM SUPERALLOYS

[75] Inventors: Ulrich Krynitz, Goslar; Armin Olbrich, Seesen; Wolfgang Kummer, Goslar; Martin Schloh, Weisbaden, all of Germany

[73] Assignees: H.C. Starck GmbH & Co, KG, Goslar; Bayer AG, Leverkusen, both of Germany

[21] Appl. No.: 817,894

[22] PCT Filed: Oct. 25, 1995

[86] PCT No.: PCT/EP95/04177

§ 371 Date: Apr. 15, 1997

§ 102(e) Date: Apr. 15, 1997

[87] PCT Pub. No.: WO96/14440

PCT Pub. Date: May 17, 1996

[30]  Foreign Application Priority Data

Nov. 2, 1994 [DE] Germany .................. 44 39 041.6

[51] Int. Cl.$^6$ ................ C25B 1/00; C25C 1/00; B01D 17/06; C01G 45/00
[52] U.S. Cl. ............... 205/538; 205/560; 205/687; 205/704; 205/766; 205/767; 423/49
[58] Field of Search ............ 205/560, 404, 205/687, 717, 718, 719, 720, 721, 766, 767, 538; 423/49

[56]  References Cited

U.S. PATENT DOCUMENTS

| 3,348,942 | 10/1967 | Davenport | 75/62 |
|---|---|---|---|
| 4,278,641 | 7/1981 | Petrov et al. | 423/49 |
| 4,298,581 | 11/1981 | Douglas et al. | 423/58 |
| 4,557,906 | 12/1985 | Douglas et al. | 423/49 |
| 4,599,222 | 7/1986 | Douglas et al. | 423/49 |
| 4,604,265 | 8/1986 | Douglas et al. | 423/49 |
| 5,442,910 | 8/1995 | Anderson | 60/266 |

FOREIGN PATENT DOCUMENTS

| 2671104 | 7/1992 | France . |
|---|---|---|
| 1942191 | 2/1970 | Germany . |
| 2248178 | 4/1973 | Germany . |
| 2305230 | 8/1974 | Germany . |
| 661976 | 11/1951 | United Kingdom . |

OTHER PUBLICATIONS

Bannard, J., Electrochemical Machining, 7 *J. Appl. Electrochem.* 1 (1977). no month available.

Kirk–Othmer, Encyclopedia of Chemical Terminology, 4th ed., vol. 12, pp. 417–458. date unavailable ©1994.

Bannard, "Electrochemical Machining", J. of Appl. Electrochem., vol. 7, pp. 1–29, 1977.

Kirk–Othmer Encyclopedia of Chemical Technology, 4th ed., vol. 12, pp. 417–458, 1994.

*Primary Examiner*—Kathryn L. Gorgos
*Assistant Examiner*—Edna Wong
*Attorney, Agent, or Firm*—Jerry Cohen

[57]  ABSTRACT

The present invention relates to a method for the decomposition of superalloys and subsequent recovery of the metallic constituents.

12 Claims, No Drawings

METHOD FOR THE DECOMPOSITION AND RECOVERY OF METALLIC CONSTITUENTS FROM SUPERALLOYS

This is a National stage application of PCT/E095/04177 filed Oct. 10, 1995.

FIELD AND BACKGROUND OF THE INVENTION

The present invention relates to a method for the decomposition of superalloys and subsequent recovery of the alloying metals. The method comprises two steps.

Superalloys are alloys which are based on cobalt or nickel and which may contain a whole series of additional elements such as, for example, aluminium, chromium, hafnium, molybdenum, platinum, tantalum and tungsten. There is a good survey of the prior art relating to the composition and characteristic properties of superalloys in the Kirk-Othmer Encyclopedia of Technology, Volume 12, Fourth Edition, pages 417–458.

In contrast to normal alloys, superalloys are not attacked in oxidising and corrosive environments. According to Swiss Material 1990, 2, 5–10, owing to their resistance to oxidation, components made of superalloys find application, for instance, as blades in aircraft turbines.

The decomposition and recovery of the alloy metals in the superalloys is of economic interest because of the relatively high precious metal content of some superalloys. Thus in special superalloys, for example, rhenium is found in a proportion of up to 6% by weight. Moreover other alloying constituents, such as, for example, platinum, tantalum, tungsten, molybdenum, are also useful metals.

According to prior art, in order to recover the metallic constituents from the superalloy, the latter is melted and atomised to a fine-particled powder in an atmosphere of protective gas. The powder is then decomposed in concentrated acid and further processed. This method of procedure is unsatisfactory, as superalloys melt only at relatively high temperatures of between 1200° C. and 1400° C. In addition the entire melting and atomising process must proceed in an inert atmosphere of protective gas, because otherwise some metals will instantly form oxides which are volatile and moreover hazardous to health. (Thus, for example, rhenium (VII) oxide has a boiling point of 360° C.). The actual melting takes place only in the atomised powder in concentrated acid and, according to experience, requires several days.

From the Journal of Applied Electrochemistry 1977, 7, 1–29, it is known that hard workpieces made of metal or alloys can also be processed by electrochemical oxidation in aqueous electrolyte solutions. This method of procedure is generally known by the term 'electrochemical machining' or 'electrochemical grinding' and is employed in the production of complex components. Superalloys can also be processed by this electrochemical method. But the method is unsuitable for the decomposition and recovery of alloying constituents, as the reaction products cannot be worked up and separated satisfactorily. Anodic oxidation in aqueous solutions gives rise to the preferential formation of hydroxides and oxides which cannot be filtered easily.

It should also be taken into consideration that through anodic oxidation many alloys form a dense oxide layer which is impermeable to an electric current and effectively prevents further oxidation of the alloy. These very robust passivating layers can be broken through only at very high electrolytic voltages of 50 volts and above. Because of this an electrochemical method in aqueous electrolytes is of no interest economically.

SUMMARY OF THE INVENTION

The object of the present invention was therefore to provide a method for the decomposition and recycling of alloying constituents from alloys, which can be carried out easily and economically. This object was fulfilled by electrochemical oxidation of the alloy in an organic electrolyte and subsequent separation of the alloying metal by a chemical separation process.

The present invention therefore provides a method for the decomposition of superalloys and subsequent recovery of the alloying metals by a wet chemical method, with the decomposition being carried out electrochemically. The method according to the invention can be applied in particular to superalloys containing metals and metal compounds. Superalloys which contain rhenium are also particularly preferred from the economic aspect.

The method according to the invention is advantageously carried out so that the electrochemical decomposition takes place by anodic oxidation in an electrolysis. Here the superalloy is used as the anode, which dissolves in the electrolyte solution owing to electrochemical oxidation.

DESCRIPTION OF PREFERRED EMBODIMENTS

A preferred electrolyte solution according to the invention comprises of one or more protonic organic solvents and one or more conducting salts. In order to improve the electrical conductivity and the solubility of the conducting salts, the electrolyte solution may also contain up to 50% of water.

Protonic organic solvents which are suitable according to the invention are (a) primary, secondary and tertiary aliphatic and aromatic alcohols such as, for example, methanol, ethanol, isopropanol, butanol and phenol and (b) β-diketonates such as, for example, acetylacetone (2,4-pentanedione).

Mixtures of the solvents can also be used according to the invention with success. Methanol, ethanol, isopropanol and acetylacetone are particularly preferred according to the invention.

Water up to a maximum of 50% can be added to the electrolyte solution in order to increase the electrical conductivity of the electrolyte system. But here it should be taken into consideration that in the case of many alloys a passivation of the anode surface sets in even with a relatively small proportion of water. The selection of too high a water content results moreover in the formation only of a not easily workable gel or sol. According to the invention it is therefore advisable to restrict the water content of the electrolyte solution to below 10%.

The function of the conducting salt which is dissolved in the electrolyte solution is to increase the conductivity of the organic solvent and thereby to facilitate the flow of the electrolytic current. Conducting salts which are suitable according to the invention are the ammonium halides and the halides, sulphates, bisulphates and nitrates of the alkali metals, alkaline earth metals and transition metals of the groups 7 to 12 of the Periodic Table of the Elements. LiCl, $NH_4Cl$, NaCl, $NaNO_3$, $CoCl_2$ and $NiCl_2$ are particularly suitable for effecting the electrochemical decomposition process according to the invention.

The concentration of the conducting salt is typically in the range of from 0.1M to the saturation limit of the salt in the electrolyte solution. Although the method according to the invention can also be carried out at lower concentrations of conducting salts, high concentrations of conducting salts, which result in a lower electrolytic voltage, are useful.

The cathode material used is a material which is inert and conductive under the operating conditions. For example, metal gratings made of platinum-coated steel are advantageous owing to the low excess potential for the evolution of hydrogen. Graphite is also a suitable and inexpensive cathode material for carrying out the method according to the invention.

The temperature at which electrolysis is carried out is not of crucial importance. The generally most useful method consists in providing the apparatus for electrolysis with a reflux condenser or with a cooling device and carrying out electrolysis at the boiling point of the liquid electrolyte solution. The resistance heating by the electrolytic current is as a rule sufficient to bring the electrolyte solution to boiling point. The method can however also be successfully carried out at temperatures below the boiling point of the electrolyte solution.

The current used in the method according to the invention can be a simple direct current or a rectified alternating current, which may also be smoothed. The current density at the anode is typically in the range of from 1 mA/cm$^2$ to 500 mA/cm$^2$, although the operating process is also possible at current densities outside this range. The electrolytic voltage in the method according to the invention is determined by a number of factors and should be maintained as low as possible. The most important factors influencing the voltage during electrolysis are the interelectrode distance between the anode and the cathode, the geometry of the electrodes, the concentration of the conducting salts and the temperature during electrolysis. The electrolytic voltage is typically in the range of from 5 V to 100 V, although the operating process is also possible at voltages outside this range.

During electrolysis the entire electrolytic bath can be placed in an ultrasonic bath in order to facilitate the mechanical detachment of the products of the anodic oxidation.

The working up and separation of the useful materials is preferably carried out in such a way that the suspension formed during electrolysis is filtered and the alloying metals are recovered by thermal and hydrometallurgical processing steps from the filtration residue thus obtained.

The separation of the deposit containing useful materials can be performed by conventional processing steps as in prior art; two preferred routes are described below.

One variant of the working up consists in calcining the dried solids content in a stream of oxygen. Rhenium is completely volatilised as $Re_2O_7$ and is removed from the gaseous atmosphere by washing.

The thermal processing step of the method according to the invention is preferably carried out as a calcination at temperatures of between 500° C. and 1200° C., preferably 600° C. and 900° C., in the presence of air and/or oxygen. The gases accumulating during the thermal processing step can be subjected to a gas washing with water or aqueous basic solutions, in the course of which the volatile useful materials are withdrawn from the gas.

The calcination product is then decomposed into further useful material constituents by hydrometallurgical separating operations such as, for example, leaching with water, decomposition with hydrochloric or hydrofluoric acid, ion exchangers.

Another variant of the working up consists in carrying out the calcination of the dried solids content of the suspension with excess calcium hydroxide and subsequently subjecting to leaching with water.

The rhenium content is bound in the form of calcium perrhenate and is separated by conventional methods.

The present invention is explained in more detail below by means of several Examples, without limitation to obvious variations in the performance of the process.

EXAMPLES

Example 1

Electrochemical decomposition in methanol, and working up

An electrolytic cell made of glass was provided with a reflux condenser and equipped with a cathode grating made of platinum-coated special steel. The anode was placed at a small distance from the cathode. A turbine blade made of a superalloy, the constituents of which are given in Table 1, was used as the anode.

TABLE 1

| Composition of the superalloy | |
|---|---|
| Element | Alloy [%] |
| Al | 6.11 |
| Co | 11.63 |
| Cr | 6.75 |
| Hf | 1.23 |
| Mo | 1.32 |
| Re | 2.45 |
| Ta | 6.04 |
| W | 4.35 |
| Ni | Remainder 60.12 |

The electrolyte solution used is a 0.5 molar solution of lithium chloride in methanol. The electrolytic current was 7 Amperes at a voltage of 14 Volts. During electrolysis the solution turned black. The detachment from the anode of polymeric metal alkoxides and of anode slime was assisted by using an ultrasonic bath. After electrolysis for a period of 325 minutes the loss of mass from the anode was 35 grams of superalloy that is, 25.7 grams of superalloy were detached per mol of electrons. The solution or suspension of metal alkoxides and anode slime thus prepared is further processed in the following manner.

The solids content is separated from the suspension by filtration. The mass after drying is 51.0 g.

In a tube furnace the residue is calcined for 60 minutes at 600° C. in a stream of oxygen. 91% of the anodically dissolved rhenium is separated out in the basic absorption solution from two gas washing bottles connected in series behind the tube furnace (500 ml containing 1.56 g/l of Re). The grey-green calcination residue, amounting to 37.4 g, is heated in 200 ml of VE water for 3 hours under reflux, then filtered and washed. 98% of nickel, 97% of cobalt and 89% of molybdenum are found in this acidic solution (50 ml containing 39.7 g/l of Ni; 7.9 g/l of Co; 0.82 g/l of Mo).

4.6 g of a dried black residue containing 41.7% of Ta, 28.8% of W and 8.9% of Hf remains, which is completely dissolved by treatment with hydrofluoric acid.

Example 2

Electrochemical decomposition in an aqueous acetylacetone-isopropanol solution

An anode consisting of the superalloy already described was dissolved in an electrolyte solution of 165 ml of isopropanol, 168 ml of acetylacetone, 667 ml of water and 11.4 g of sodium chloride using the apparatus for electrolysis described in Example 1. A voltage of 15 V was applied. The electrolytic current was 5 A. 26.4 g of superalloy was decomposed per Faraday of charge. Working up was carried out by one of the two processing variants already described.

Example 3

Electrochemical decomposition in methanol containing 10% of water

An anode consisting of the superalloy already described was dissolved electrochemically in an electrolyte solution of methanol to which had been added 10% of water and LiCl. An electrolytic current of 7 A flowed at a voltage of 20 V. 24.8 g of superalloy was decomposed per Faraday of charge. Working up was carried out by one of the two processing variants already described.

We claim:

1. Method for recovery of rhenium from superalloys containing rhenium and other alloying metals, comprising the steps of:
   (a) providing a superalloy with one or more minority amounts of alloying metals, including rhenium;
   (b) decomposing the superalloy electrochemically by anodic oxidation in an electrochemical cell, wherein the cell has an electrolyte mixture comprising:
      (1) at least one organic solvent component selected from the group consisting of alcohols and beta-diketones,
      (2) water, and
      (3) at least one conducting salt,
   (c) filtering solid particles from the electrolyte to create a filtration residue and calcining the filtration residue at 500° to 1,200° C. in an oxidizing gas stream to form a volatile $Re_2O_7$ contained in the gas stream, and
   (d) washing the gas stream containing $Re_2O_7$ with water.

2. The method of claim 1 wherein the water content of the electrolyte is no greater than 50%.

3. The method of claim 1 wherein the water content of the electrolyte is no greater than 10%.

4. Method according to any of claims 1–3 wherein the organic solvent component is selected from the class consisting of methanol, ethanol, isopropanol and acetyl acetone.

5. Method according to claim 4 wherein the conducting salt component is selected from the class consisting of halides; sulfates; nitrates; acetates of metals selected from the group consisting of periodic table groups 1, 2 and 7–12; and ammonium salts.

6. Method according to any of claims 1–3 wherein the conducting salt component is selected from the class consisting of halides; sulfates; nitrates; acetates of metals selected from the group consisting of periodic table groups 1, 2 and 7–12; and ammonium salts.

7. Method according to claim 6 wherein the conducting salt is selected from the class consisting of lithium chloride, ammonium chloride, sodium chloride, cobalt chloride, sodium nitrate and nickel chloride.

8. Method for the recovery of rhenium from rhenium containing superalloys, comprising the steps of:
   (a) decomposing the superalloy electrochemically by anodic oxidation in an electrolytic cell, wherein the electrolyte is a mixture comprising:
      (1) at least one organic solvent component selected from the group consisting of alcohols and beta-diketones,
      (2) water, and
      (3) at least one conducting salt,
   (b) filtering solid particles formed in the electrolyte to create a filtration residue during electrochemical decomposition,
   (c) calcining the filtration residue at temperatures of from 500° to 1,200° C. in contact with an excess of calcium hydroxide, where rhenium is bound in the form of calcium perrhenate, and
   (d) leaching the calcium perrhenate with water.

9. Method according to claim 8 wherein the leaching is carried out at pH of 4–12 and wherein the alloying metals are recovered from the leach water by hydrometallurgy.

10. Method according to claim 8 wherein the pH range is 6–8.

11. Method according to any of claims 8–10 wherein the water content of the electrolyte is no greater than 50%.

12. Method according to any of claims 8–10 wherein the water content of the electrolyte is no greater than 10%.

* * * * *